H. LA RUE.
THRESHING CYLINDER.
APPLICATION FILED MAR. 7, 1914.
1,111,262.
Patented Sept. 22, 1914.
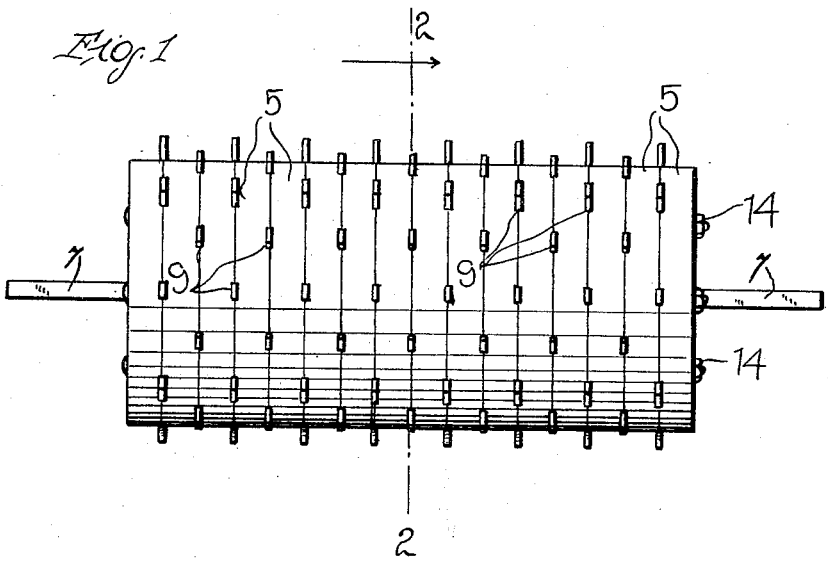
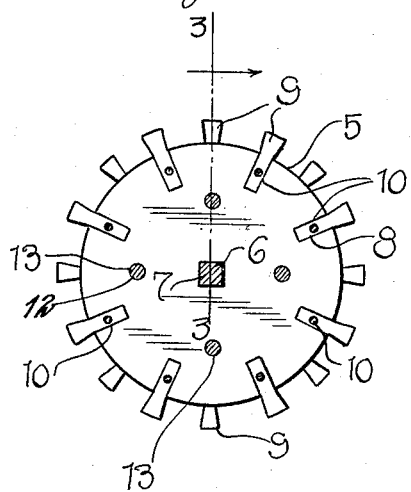
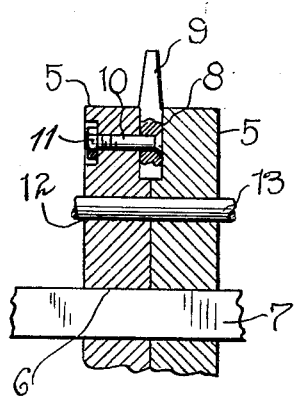
Witnesses
Robert M. Sutphen
A. A. Hind
Inventor
H. La Rue
By Watson E. Coleman
Attorney

UNITED STATES PATENT OFFICE.

HENRY LA RUE, OF HYANNIS, NEBRASKA.

THRESHING-CYLINDER.

1,111,262. Specification of Letters Patent. Patented Sept. 22, 1914.

Application filed March 7, 1914. Serial No. 823,158.

*To all whom it may concern:*

Be it known that I, HENRY LA RUE, a citizen of the United States, residing at Hyannis, in the county of Grant and State of Nebraska, have invented certain new and useful Improvements in Threshing-Cylinders, of which the following is a specification, reference being had to the accompanying drawings.

This invention relates to an improved threshing cylinder, and has for its primary object to provide a cylinder for threshing machines and the like having certain novel structural features, whereby any one or more of the teeth may be readily removed when broken and replaced by new teeth.

A further and more specific object of the invention resides in the provision of a threshing cylinder embodying in its construction a plurality of disks, the opposed faces of adjacent disks being provided with teeth receiving recesses, and means for rigidly connecting the cylinder disks and preventing their relative longitudinal movement upon the driving shaft.

The invention has for a further object to provide a device of the above character which is simple and durable in its construction, may be produced at small manufacturing cost, and is highly efficient, reliable and convenient in practical use.

With the above and other objects in view, which will become apparent as the description proceeds, the invention consists in certain details of construction, combination and arrangement of parts as will be more fully hereinafter described and claimed.

For a full understanding of the invention, reference is to be had to the following description and accompanying drawings, in which—

Figure 1 is a side elevation of a threshing cylinder constructed in accordance with the preferred embodiment of my invention. Fig. 2 is a section taken on the line 2—2 of Fig. 1. Fig. 3 is a section taken on the line 3—3 of Fig. 2.

Referring in detail to the drawings, 5 designates a plurality of disks constructed of wood or other material, which constitute the body of the cylinder. Each of these disks is centrally formed with a rectangular opening 6 to receive the square cylinder shaft 7.

Each of the disks 5 is provided in its opposite faces with radially extending recesses 8 which open at their outer ends upon the periphery of the disk. The recesses in one face of the disk are staggered or disposed intermediate of the recesses in the opposite face of the disk. The recesses in the face of one disk are adapted to receive portions of the cylinder teeth 9 which are disposed in the recesses in the opposed face of an adjacent disk, said cylinder teeth being rigidly secured to the latter disk by means of bolts or rivets shown at 10, the nut ends of which are countersunk as at 11 in the opposite face of the disk. It will thus be apparent that when the disks 5 are assembled to form the threshing cylinder, the teeth 9 will be arranged in staggered relation as clearly shown in Fig. 1 of the drawing. These disks are provided with a circularly arranged series of openings 12 between the central openings 6 and the teeth receiving recesses, said openings coinciding or registering with each other when the disks are assembled to receive the connecting or tie rods 13. These rods are provided with heads upon one of their ends and nuts 14 are threaded upon the opposite ends thereof for engagement with one end of the cylinder to draw the rods through the cylinder disks and tightly clamp said disks together upon the cylinder shaft.

From the foregoing description taken in connection with the accompanying drawing, it is believed that the construction, manner of operation and several advantages of my invention will be clearly and fully understood. It will be observed that by constructing the cylinder of a plurality of disks the threshing teeth may be very easily and quickly removed when necessary. Several different forms of these teeth may be employed in connection with the cylinder for operation upon different varieties of grain, thereby greatly increasing the general convenience and serviceability of devices of this character.

It will of course be obvious that the cylinder may be made of any desired length or diameter and instead of arranging the cylinder disks upon a rectangular cylinder shaft, they may be readily secured upon a cylindrical shaft in any approved manner. Owing to the extremely simple construction of the invention it will further be appreciated that the same can be produced at small manufacturing cost.

While I have shown and described the preferred embodiment of my invention, it is to be understood that it is susceptible of considerable modification therein, and I therefore reserve the privilege of resorting to all such legitimate changes as may be fairly embodied within the spirit and scope of the invention as claimed.

What is claimed is:

The herein described threshing cylinder including a plurality of disks, each of said disks being provided in its opposite faces with recesses opening upon the periphery thereof, the recesses in one face of the disk being arranged in staggered relation to the recesses in the opposite face thereof, threshing teeth adapted to be arranged in the recesses in one face of each disk and to project into the opposed recesses in the face of a contiguous disk, individual securing bolts for the teeth extending through the first named disks, each of the disks being provided with a series of openings inwardly of the teeth receiving recesses, and longitudinally extending tie rods removably disposed through said openings to connect the disks and hold the same against relative movement.

In testimony whereof I hereunto affix my signature in the presence of two witnesses.

HENRY LA RUE.

Witnesses:
W. H. PRETTYMAN,
C. O. JONES.

Copies of this patent may be obtained for five cents each, by addressing the "Commissioner of Patents, Washington, D. C."